(12) United States Patent
Hoffis

(10) Patent No.: US 7,037,368 B2
(45) Date of Patent: May 2, 2006

(54) MID-KILN INJECTION OF WASTE-DERIVED MATERIALS

(75) Inventor: Lawrence L. Hoffis, Carmel, IN (US)

(73) Assignee: Buzzi Unicem USA, Inc., Indianapolis, IN (US)

( * ) Notice: Subject to any disclaimer, the term of this patent is extended or adjusted under 35 U.S.C. 154(b) by 48 days.

(21) Appl. No.: 10/834,429

(22) Filed: Apr. 29, 2004

(65) Prior Publication Data

US 2005/0241536 A1    Nov. 3, 2005

(51) Int. Cl.
*C04B 18/16*    (2006.01)

(52) U.S. Cl. .................. 106/697; 106/739; 106/745; 106/762

(58) Field of Classification Search ............... 106/697, 106/739, 745, 762
See application file for complete search history.

(56) References Cited

U.S. PATENT DOCUMENTS

| | | | |
|---|---|---|---|
| 1,893,696 A * | 1/1933 | Colton | ............... 106/749 |
| 4,161,411 A | 7/1979 | Sell et al. | |
| 5,473,998 A | 12/1995 | Allen et al. | |
| 5,494,515 A | 2/1996 | Young | |
| 5,549,058 A | 8/1996 | Tutt | |
| 5,724,899 A | 3/1998 | Reese et al. | |
| 5,888,256 A | 3/1999 | Morrison | |
| 6,050,203 A | 4/2000 | Reese et al. | |
| 6,213,764 B1 | 4/2001 | Evans | |
| 6,331,207 B1 | 12/2001 | Gebhardt | |
| 6,537,365 B1 | 3/2003 | Ikabata et al. | |
| 6,637,196 B1 | 10/2003 | Tost | |
| 6,685,771 B1 | 2/2004 | Long et al. | |
| 2003/0029364 A1 | 2/2003 | Bland et al. | |

* cited by examiner

*Primary Examiner*—Elizabeth D. Wood
(74) *Attorney, Agent, or Firm*—Maginot Moore & Beck

(57) ABSTRACT

A method for the production of cement clinker comprises the introduction of non-traditional materials into the kiln, preferably at a mid-kiln locations. The non-traditional materials are materials that are difficult, expensive or environmentally challenging for disposal. In one embodiment, weathered clinker is introduced into the kiln to admix with the raw material mix to augment clinker production. In another embodiment, bird, animal or human manure is added to the kiln so that gaseous reducing agents can be released by the manure and combine with certain noxious gases generated during the clinker production, to thereby reduce the noxious gas output. In other embodiments, other non-traditional waste-derived fuels are added to the kiln during clinker production, including railroad ties coated with creosote, industrial, commercial and consumer rubber components, such as rubber hoses, unshredded plastics, and organic materials, such as bird and animal meal.

4 Claims, 3 Drawing Sheets

Wet Process Kiln or Long Dry Process Kiln

MID-KILN INJECTION OF WASTE-DERIVED MATERIALS

BACKGROUND OF THE INVENTION

This invention relates in general to the manufacture of cement clinker, particularly in rotary kilns. More specifically, the invention relates to the introduction of slag into the kiln to enhance the clinker production process.

The details of a typical cement pyroprocessing operation are well known. For purposes of illustration, one type of rotary kiln for manufacturing Portland cement is depicted in FIG. 1. Air and a primary fuel, such as coal, are injected into the firing or clinkering end of the kiln and are combusted to supply heat energy. Wet or dry raw materials, known as raw mix, for producing cement, such as limestone, clay and sand, are injected into the feed end of the kiln opposite the clinkering end. The kiln is inclined so that as the kiln rotates, the raw materials move through the kiln counter-current to the direction of the flow of the hot combustion gases so that the raw materials are subjected to progressively higher temperatures. For instance, at the input end, a pre-calcining zone can be provided that has a gas temperature of about 1000° F. (538° C.). The kiln gas temperature can be increased to about 1600° F. (871° C.) in a calcining zone where the $CaCO_3$ in the raw materials is decomposed. The calcined material then passes to a clinkering zone where it faces the burning zone temperature inside the kiln, approximately 2732° F. (1500° C.). It is in this zone that the feedstock is converted into the typical cement compounds, such as tricalcium silicate, dicalcium silicate, tricalcium aluminate, etc. A cooling zone follows at the output of the kiln. The resulting compound, or clinker, is later mixed with other materials, such as gypsum, and then finely ground to produce Portland cement.

A variety of materials have been added to the cementious compositions in the production of cement clinker to help increase the clinker yield. The use of slag in the production of cement dates back to 1774 when a mortar was made with ground blast-furnace slag and slaked lime. The first commercial use of blended slag cements arose in Europe in the mid-1800's. A current example of a blended cement using a blast-furnace slag is found in U.S. Pat. No. 5,976,243. Many slags are well suited for use in clinker production because the slags can include many chemical constituents common to the cement chemical compounds. In addition, many slags can be added to the cement clinker without any deleterious effects to the cement kiln or to the clinker product. Thus, the slag, which is essentially a waste material from metal production, takes on value and can reduce the quantity of more expensive feedstock or virgin feedstock required in the clinker production.

The use of slag as a feedstock in the pyroprocessing of cement, including Portland cement, is also known. For example, U.S. Pat. No. 2,600,515, issued in 1952, discloses introducing blast-furnace slag directly into the flame in order to avoid problems associated with the fusibility of slag. The patent of Young, U.S. Pat. No. 5,421,880, describes introducing a steel slag at the feed end of the kiln to combine with the feedstock material, and then heating the mixture to form cement clinkers. This patent, and a subsequent U.S. Pat. No. 5,494,515 to the same inventor, contemplate adding a crushed and screened air-cooled slag to the lime-containing feedstock material.

It can be advantageous to burn waste materials in cement kilns, for several reasons. Such wastes would otherwise have to be disposed in a landfill or other long term containment, or incinerated as a means of destroying the materials. Landfill disposal typically is more expensive and less desirable than disposal by recovering the useful energy value of the waste. While these wastes provide energy to the kiln system, the kiln operator typically charges a "tipping fee", or service charge for accepting and disposing of the waste. The tipping fee is charged because there usually is a cost for handling and/or for pollution control associated with the use of diverse waste streams. Thus, use of waste-derived fuel in a cement kiln provides a benefit to the fuel user and to the waste generator. Namely, the kiln operator may gain significant income from tipping fees as well as fuel value that reduces the demand for conventional fossil fuels, and the waste generator may have access to a lower cost disposal option for the waste. The environment also benefits from use of waste as fuel, because cement kilns have efficient destructive capacity for various wastes as fuel and resultant fuel combustion products, due to high burning zone temperatures and long retention times of materials in the high temperature zone. Valuable landfill space is conserved, fossil fuels are conserved, and wastes that might have contaminated land or water are efficiently destroyed.

Types of waste that have been used as fuel or that have been recycled or processed in a variety of high temperature kiln situations, including cement kilns, according to the prior art include waste tires, either whole or when reduced in size by some means (U.S. Pat. No. 5,473,998); hazardous waste liquids, or solids or both (U.S. Pat. No. 5,454,333); agricultural waste, for example rice hulls; paper mill sludge (U.S. Pat. No. 5,392,721); soil, sludge, sand, rock or water contaminated with organic solvents and/or toxic metals (U.S. Pat. No. 4,921,538); sewage sludge (U.S. Pat. No. 5,217,624); petroleum refinery sludge (U.S. Pat. No. 5,141,526); various hazardous combustible wastes (see U.S. Pat. No. 5,454,333 or U.S. Pat. No. 4,984,983) and non-hazardous low-grade fuel wastes such as wood, paper and chemical waste (U.S. Pat. No. 5,336,317).

Waste that has little or no fuel value, that is, principally inorganic waste, also may be added to cement kiln raw material mix. Cement kilns consume a large quantity of raw materials consisting principally of calcium carbonate ($CaCO_3$), silica ($SiO_2$), alumina ($Al_2O_3$), and iron oxide ($Fe_2OP_3$). Raw materials also include lesser amounts of other compounds including magnesium carbonate or oxide, sulfur oxide (usually $SO_3$ or $SO_4$), and compounds of titanium, phosphorous, potassium, sodium, chloride, and others. Some of these may be desirable and some undesirable or detrimental in the raw material mix used for making cement. Each should be present as a set percentage of the whole or have an upper limit on the allowable percentage in the raw material mix that will be determined by the individual properties of each kiln system and the chemistry of its raw material supply. Industrial and other wastes that contain significant amounts of one or more of these compounds may be used to augment raw material for a cement kiln.

The usual locations for the input of fuel, air and raw mix are at the opposite ends of the kiln. In addition, flue gases escape at the elevated feed end of the inclined rotary kiln tube. Waste-derived fuel is sometimes added as a supplemental fuel at the mid-kiln location shown in FIG. 1. The temperature at this mid-kiln location is high enough to assure complete substantially complete combustion of the waste so that the kiln can derive fuel value from the waste material. Waste type fuels that have been introduced at a mid-kiln location include hazardous waste materials, as disclosed in U.S. Pat. No. 6,050,203, and whole or shredded tires, as disclosed in U.S. Pat. No. 6,213,764.

An important problem that must be addressed in clinker manufacturing is the emission of pollutants in the flue gases of cement kilns fueled according to the prior art. Flue gas exiting a cement manufacturing plant will contain products of combustion, including carbon dioxide and $NO_x$, along with water vapor and other gases from drying and chemically altering the raw materials in the kiln. The major fuels used in cement making are coal, oil, natural gas, and wastes, where coal is the principal fuel in the industry worldwide. Since coal is predominantly carbon, which oxidizes during combustion to form carbon dioxide, the flue gases from coal fired kilns contain a substantial proportion of carbon dioxide as a combustion product. Moreover, nitrogen oxides, $NO_x$, including at least nitrogen monoxide, NO, and nitrogen dioxide, $NO_2$, are formed from atmospheric oxygen, atmospheric nitrogen and the compounds containing nitrogen in the fuel. At combustion temperatures above about 1600° C., with sufficiently long dwell times of the combustion gases in the flame, the essential product formed from the molecular nitrogen can be nitrogen monoxide, NO. Significant effort has gone into eliminating $NO_x$ emissions, such modified fuels and scrubber system.

There is a consistent need to improve the efficiency and yield of the cement clinker production process. Moreover, the need remains a constant requirement to reduce pollution causing discharges from the cement kilns. There is also a common over-riding need to reduce pollutants of all types, including solid waste materials.

SUMMARY OF THE INVENTION

In order to address these needs, the present invention contemplates modifications to a process for the production of cement clinker in a heated rotary kiln. In particular, the invention contemplates the introduction of non-traditional materials into the kiln as the clinker is being produced. In one embodiment, weathered clinker is injected into the kiln prior to the discharge end of the kiln. The water content of the weathered clinker is driven off by the heat of the kiln and the weathered clinker admixes with the new clinker as it is produced. The weathered clinker thus augments the clinker production of the kiln without the need for additional raw mix.

In another embodiment, a material is introduced into the kiln that releases a gaseous reducing agent that reacts with a gas by-product produced during the cement clinker production. In a specific embodiment, the material is organic, the gas by-product is $NO_x$ and the gaseous reducing agent is ammonia. In this embodiment, the material is bird, animal or human manure or excrement. The manure releases the gaseous ammonia that then reacts with the $NO_x$ to reduce the amount of $NO_x$ discharged as flue gas. The excrement can be obtained from commercial livestock or fowl facilities or from municipal waste treatment facilities.

With each of these embodiments, the non-traditional material is preferably introduced into the kiln environment at a mid-kiln position. This position can be within or downstream of the calcining zone. With both of these embodiments, the non-traditional material need not constitute a supplemental fuel. However, it is contemplated that such materials can be added along with the recited non-traditional materials to thereby reduce the requirements for traditional fuels at the firing end of the kiln. In certain embodiments of the invention these non-traditional materials can include fuel materials such as railroad ties coated with creosote, industrial rubber products, such as rubber hoses, other non-organic materials, such as non-shredded plastics or processed sludge, or other organic materials, such as bird or animal meal. These non-traditional materials can pose disposal and environmental problems, so their use as supplemental fuel in the production of cement clinker solves two problems—the disposal of the non-traditional materials and the reduction of fuel requirements for the kiln.

It is one object to provide improvements to the process for production of cement clinker. One of the improvements is to increase the clinker yield or output without the necessity of increasing the amount of raw mix fed to the kiln. Another object is to allow for the production of additional clinker where the system to introduce raw mix feed is used to maximum capacity, but the kiln has capacity to produce additional clinker. That object may be accomplished through introduction of weather clinker outside the raw mix feed system (i.e., though mid-kiln introduction). A further improvement reduces certain noxious emissions in the flue gases generated during the clinker production process.

A further object is to reduce the disposal and environmental impact of certain materials that are otherwise problematic. This object can be achieved with materials that can augment the clinker production process, either as a supplemental fuel, as a "filler" material, or as a pollution reducing material.

Other objects and significant benefits of the invention will become apparent upon consideration of the following written description taken together with accompanying figures.

DESCRIPTION OF THE PREFERRED EMBODIMENTS

Figure 1:
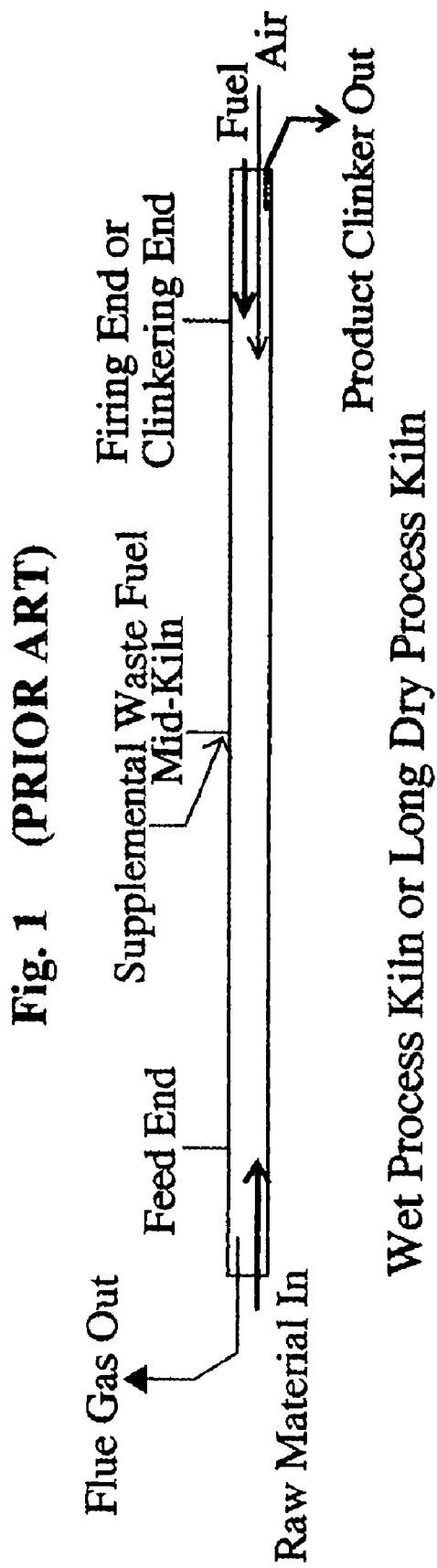
FIG. 1 is a schematic depiction of a process kiln of the prior art.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates the addition of non-traditional waste materials to a cement kiln, especially a rotary long kiln. One such waste material is weathered clinker. Weathered clinker is previously manufactured clinker that has been stored for a significant amount of time, usually outdoors. Most cement production is seasonal, with the highest demand for clinker coming in the summer. During the summer months, most cement production facilities are running at full capacity. However, due to strong product demand, the typical plant capacity cannot keep up with the production needs. Thus, many cement clinker manufacturers rely on stockpiling clinker produced during the "off" months, such as during the winter. This stockpiled clinker is exposed to the elements, and particularly to rain and snow. Over time, the cement clinker absorbs water, typically at the outer shell of the clinker particles. If the clinker absorbs enough water, the quality of the clinker is compromised and ultimately results in a poor grade concrete product. Consequently, a certain amount of the stockpiled clinker is removed as waste.

The present invention contemplates a new use for this weathered clinker. In accordance with one embodiment of the invention, weathered clinker is added to the kiln, preferably at a mid-kiln location. Since the weathered clinker has already undergone the calcining and clinkering process, it does not require any further heat or chemical processing to change its composition into "viable" clinker that may be ground into cement meeting application quality specifications; however, the heat through the clinkering zone drives the moisture from the weathered clinker. Moreover, the weathered clinker does not physically or chemically break down even at clinkering temperatures. The weathered clinker is not used as a fuel, like traditional waste materials in kiln operations. Instead, the weathered clinker allows a 1:1 increase in viable clinker output (and thereby a reduction in the need for raw materials), as one short ton of weathered clinker running through the clinkering zone becomes one short ton of fresh clinker. Thus, while weathered clinker is undesirable in any significant concentration as a primary cement component, once it is rerun through the calcining zone it becomes identical to viable, newly generated clinker.

It has been known to physically combine weathered clinker with newly manufactured "good" clinker to produce a hybrid product outside the clinker production facility. However, it is difficult to mix the "good" and "bad" clinker, and even more difficult to produce a uniformly mixed hybrid clinker product. Furthermore, only very limited amounts of "bad" clinker may be ground with "good" clinker without adversely effecting the quality of the finished cement. On the other hand, since the present invention contemplates introducing the weathered clinker during the production of new clinker, the resulting product is a uniform "good" clinker. Since the weathered clinker moves through the tilted rotating kiln with the raw mix, it becomes fully blended with the raw mix as it is transformed to clinker. Introduction of weathered clinker into the kiln can be accomplished by introducing the weathered clinker mid-kiln, rather than simply at the feed end (although feed end introduction can be utilized). Preferably, the weathered clinker is introduced in the middle third of the rotating kiln to allow complete mixing before the calcined raw mix and weathered clinker reach the clinkering end. The weathered clinker can be injected at or downstream of the calcining zone (i.e., between the calcining and clinkering zones).

Figure 2:
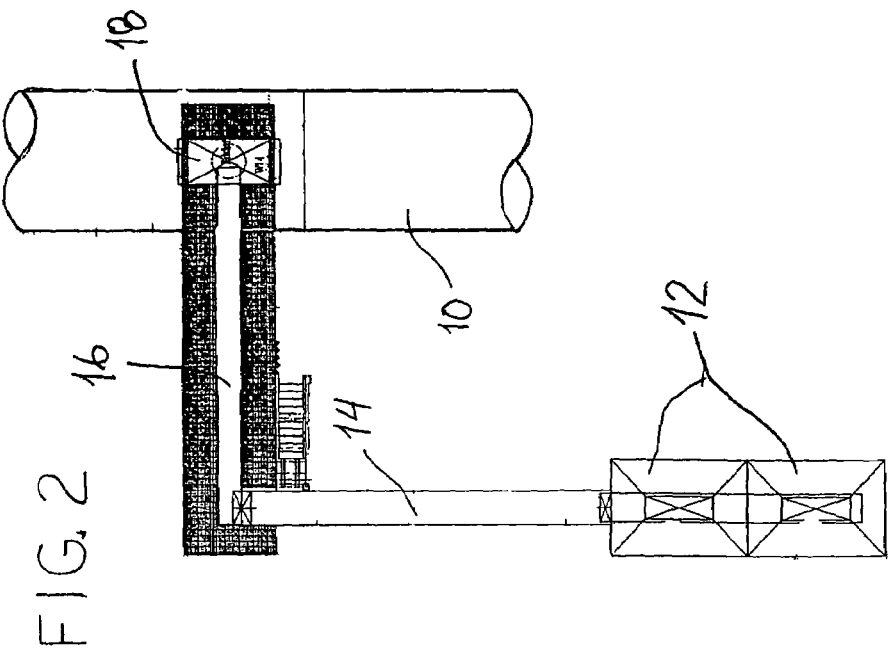
FIG. 2 is a top plan view of a cement clinker production facility in accordance with the present invention.
Figure 3:
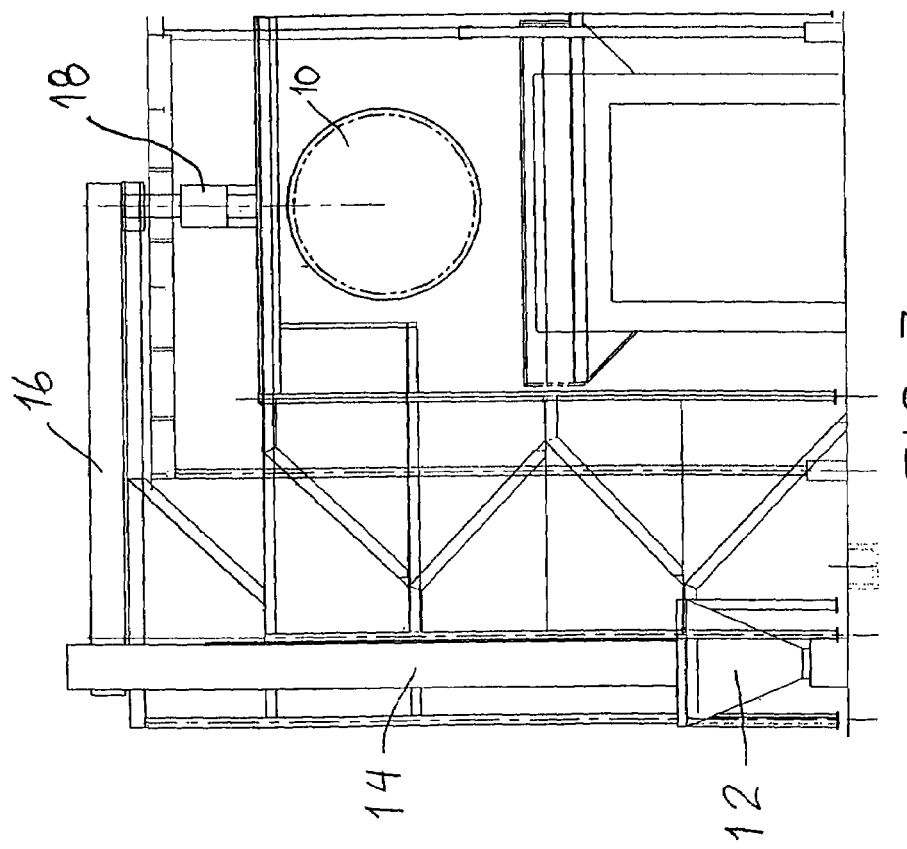
FIG. 3 is a front view of the cement clinker production facility shown in FIG. 2.

A cement clinker production facility adapted for mid-kiln introduction of weathered clinker is depicted in FIGS. 2 and 3. The weathered clinker, as well as other waste products, can be loaded into hoppers 12 at the entrance to the facility. Depending upon the state of the incoming weathered clinker, some pre-processing may be necessary to break up large chunks of the material. It is not anticipated that grinding or comminuting of the clinker would be necessary, provided the weathered clinker is sized to be carried in the hoppers 12. A vibratory feeder may be sufficient to ensure that the weathered clinker is reduced to acceptable particle dimensions for introduction into the kiln. A vertical conveyor 14 can carry the weathered clinker and other materials up to a feed conveyor 16 arranged above the rotating kiln tube 10. The two conveyors can be of a variety of configurations known in the cement manufacturing industry. For instance, the vertical conveyor 14 can be a belt conveyor, while the feed conveyor 16 can be a sealed tube or pneumatic conveyor. The discharge end of the feed conveyor 16 is positioned over a batcher 18 that is situated above the rotating kiln tube. Material drops into the batcher from the feed conveyor, and the batcher is arranged so that material within the batcher can drop directly into the rotating kiln tube.

Figure 4:
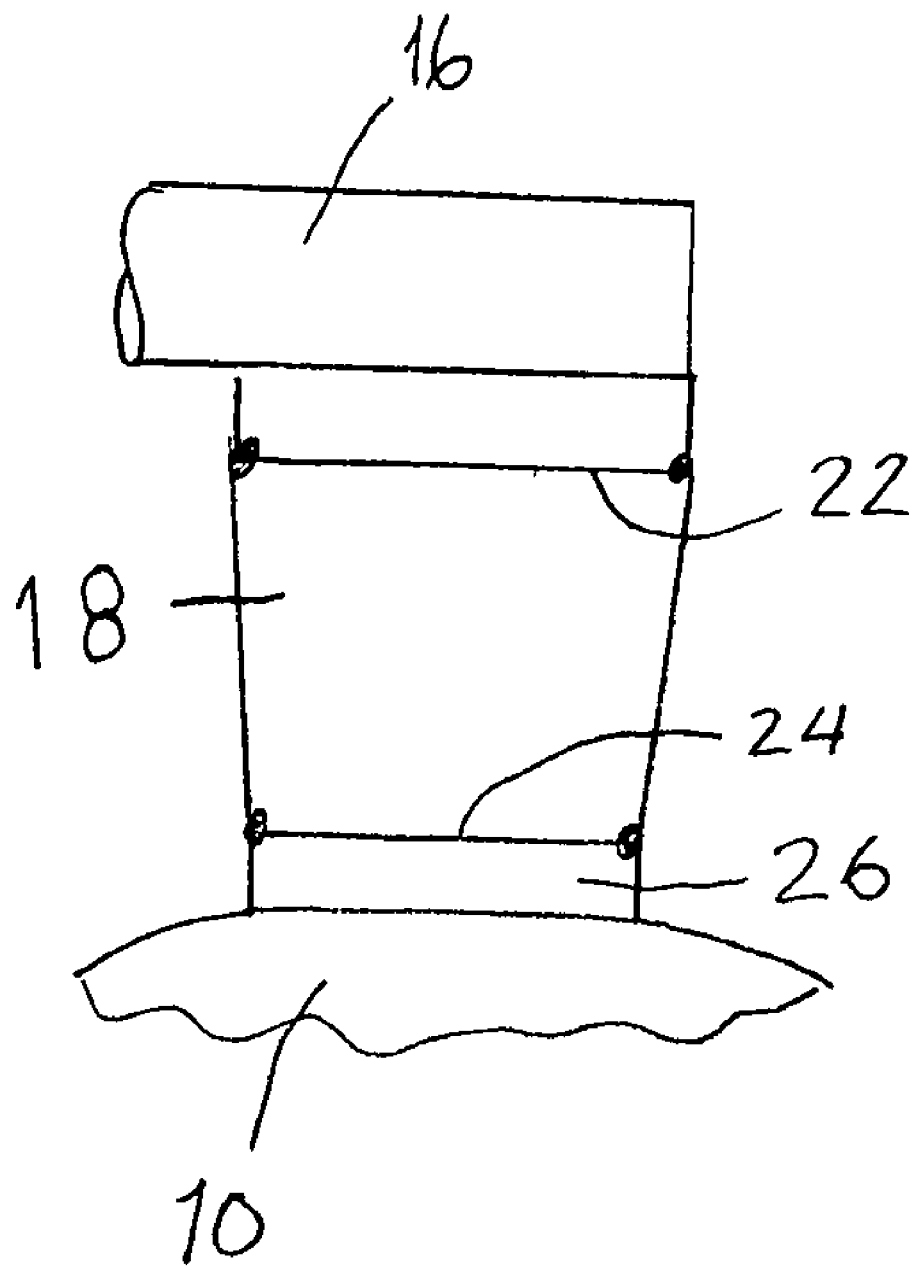
FIG. 4 is a detailed representation of a batcher for use in the cement clinker production facility shown in FIGS. 2 and 3.

One example of a batcher is depicted in FIG. 4. The batcher 18 can include a fill gate 22 that opens to accept material from the feed conveyor 16. Once the batcher is full, the fill gate 22 is closed and a signal can be sent to halt the feed conveyor 16. The batcher can include a sensor to determine whether the batcher is full. The sensor can be, for instance, a load cell that measures the filled weight of the batcher. The kiln tube can be provided with a mid-kiln chute 26 that opens at a pre-determined position of the kiln for a pre-determined length of time. When the chute 26 is open, the feed gate 24 of the batcher 18 can be opened so that the material within the batcher is conveyed into the chute, and ultimately into the kiln. In a preferred embodiment, the batcher is directly aligned along a vertical axis through the center of the kiln tube, and the weathered clinker and other materials fall by gravity through the mid-kiln chute 26. Structures for the kiln chute 26, batcher 18 and the interaction between the chute and batcher are known in the art. For instance, automated chutes are described in U.S. Pat. Nos. 6,050,203; 5,724,899 and 5,473,998, the disclosures of which are incorporated herein by reference. In accordance with the invention, the chutes opening into the kiln can be timed to remain open a sufficient time to allow the batcher 18 to dump its entire contents into the kiln. For a typical kiln, rotating at 60–70 revolutions per hour, the kiln chute can remain open for about 3–5 seconds. In certain embodiments, up to 21 tons per hour of weathered clinker can be added to the middle of the kiln which produces about 83 tons per hour of clinker. Thus, the batcher 18 can preferably hold up to 0.3 tons of material that will be dropped into the kiln when the chute 26 passes underneath.

It is contemplated that the weathered clinker can be provided in sufficient quantity to account up to 20 percent of the total clinker output. Any water content of the weathered clinker will be driven off by the high temperatures of the kiln. The weathered clinker will naturally admix with the clinker materials within the kiln as the kiln rotates. It is also contemplated that more than just the weathered clinker can be injected into the kiln with the weathered clinker, preferably at the mid-kiln chute. For instance, one of the hoppers 12 at the base of the vertical conveyor 14 can hold supplemental fuel materials, such as shredded tires or other supplemental fuels including solid hazardous wastes, wood chips, animal meals, paper sludge, and the like. When the weathered clinker is introduced at the feed end of the kiln, the supplemental materials must be selected appropriately.

In one feature of the invention, the supplemental materials are all introduced mid-kiln. Mid-kiln injection of supplemental materials is particularly appropriate where the material itself is not involved in the chemical reactions that produce the clinker and is not necessary as a fuel to maintain the kiln temperature. Thus, the weathered clinker discussed above is ideal for mid-kiln introduction since it is not necessary to perform either of these two noted functions. The weathered clinker does not participate in the calcining or clinkering phases of the kiln operation.

Another breed of supplemental materials well-suited for mid-kiln introduction includes materials that react with the kiln atmosphere. As explained above, the combustible fuels used to generate the high kiln temperatures produce gaseous by-products that can have deleterious environmental effects if exhausted untreated into the atmosphere. One of those gaseous by-products is $NO_x$. This pollutant can be reduced by the use of specialized fuels or by the addition of scrubbers that process the exhausted flue gases, but both approaches can be very expensive.

The present invention contemplates a unique supplemental material that helps reduce $NO_x$ emissions in the flue gas exhausted from the kiln. It is known that a reduction of the nitrogen oxide emissions from an internal combustion engine can be effected with the aid of selective catalytic reduction to form atmospheric nitrogen ($N_2$) and water vapor ($H_2O$). The reducing agents used are either gaseous ammonia ($NH_3$), ammonia in aqueous solution, or urea in aqueous solution. $NO_x$ reducing agents that work well in an automotive catalytic converter are generally ineffective in a high temperature cement kiln. First, gaseous or aqueous reducing agents are difficult to store, convey and inject into a rotating kiln, particular at mid-kiln locations. Second, the gaseous or aqueous reducing agents may be too volatile to withstand the high kiln temperatures.

The present invention contemplates a solid medium for introducing gaseous reducing agents into the gas environment of the kiln—namely, processed or un-processed excrement or manure. Bird and animal excrement, such as chicken feces, has an ammonia content that can be released when the excrement is subject to the hot environment of the kiln. When provided in sufficient quantity, the released ammonia can react with the ambient $NO_x$ before the ammonia volatizes in the extreme heat environment. Other types of animal excrement can be used, such as horse, pig or cattle manure, as well as human excrement obtained from a municipal waste treatment facility. Preferably, the manure is dried for transport to the cement manufacturing facility and to facilitate handling at the site. Use of bird or animal excrement not only helps reduce $NO_x$ emissions, it also addresses a particularly acute environmental concern. Disposal and/or treatment of bird and animal waste are major problems. Improper treatment of manure has led to pollution of surface and ground water, and even to fish kills. Use of municipal waste can reduce the operating requirements of the waste treatment facility.

The quantity of bird and animal manure that requires treatment or disposal can be significantly reduced by using excrement as a mid-kiln supplement in the production of cement clinker. Adding the manure at mid-kiln locations interposes the gaseous reducing agent, ammonia, released by the manure between the burning fuel at the discharge end of the kiln tube and the flue gas exhaust at the feed end of the kiln. Thus, the combustion gases flow through the gaseous reducing agent and the $NO_x$ content combines with the ammonia to produce nitrogen and water. Manure is a readily and constantly available "resource" for introduction into a cement production kiln. The chemical make-up of most manure ensures that the bulk of the manure content will be incinerated in the extremely high kiln temperatures. Moreover, this chemical make-up introduces a gas that can help reduce noxious emissions from the kiln.

It is contemplated that materials other than manure may be introduced that share these same properties—i.e., a material that substantially completely combusts within the kiln and that releases a gaseous reducing agent that can combine with the noxious gases produced within the kiln to reduce the noxious or polluting nature of the flue gas emissions. The material can react with $NO_x$ or other noxious gases within the kiln to reduce the polluting effect of the flue gas discharged from the facility. For instance, by-products of the calcining and clinkering phases include $CO_2$ and $SO_x$, which can react with a properly selected gaseous reducing agent. As a further alternative, the material may not completely combust but may instead release the gaseous reducing agent when exposed to the heated environment of the kiln. In this case, the material must be readily separable from the cement clinker or must not have a deleterious effect on the properties of the clinker if the material becomes admixed before discharge.

Another inventive feature resides in the introduction of non-traditional materials at mid-kiln locations of a cement production kiln. These materials must substantially completely combust within the kiln so that only their combustion by-products combine with the cement clinker at the output end of the kiln. Moreover, these materials preferably exhibit exothermic properties during combustion so that they contribute to heating the kiln and lessen the requirements for traditional fuels at the clinkering end of the kiln. For instance, acceptable mid-kiln materials include rubber hoses and similar rubber industrial, commercial and consumer products, unshredded plastics, processed sludge and railroad ties that are coated in creosote. These materials pose a significant disposal problem and are usually tossed into landfills. Using these materials as a supplemental fuel for clinker production solves the disposal problem and reduces the fuel requirements for the kiln. Nominally, these supplemental fuels do not increase the noxious content of the discharge flue gas above the output from traditional fuels. These non-traditional materials can be combined with the noxious gas reducing materials mentioned above at the mid-kiln location.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method for the production of cement clinker in a heated kiln having a feed end for receiving raw mix and a discharge end at which the clinker is discharged, comprising the step of introducing weathered clinker into the kiln prior to the discharge end of the kiln.

2. The method for the production of cement clinker according to claim 1, wherein the weathered clinker is introduced into the kiln at the mid-kiln location.

3. The method for the production of cement clinker according to claim 2, wherein the weathered clinker is introduced into the kiln at the calcining zone.

4. The method for the production of cement clinker according to claim 2, wherein the weathered clinker is introduced into the kiln downstream of the calcining zone.

* * * * *